(12) United States Patent
Ruslyakov et al.

(10) Patent No.: US 10,970,179 B1
(45) Date of Patent: Apr. 6, 2021

(54) AUTOMATED DISASTER RECOVERY AND DATA REDUNDANCY MANAGEMENT SYSTEMS AND METHODS

(71) Applicant: Acronis International GmBh, Shaffhausen (CH)

(72) Inventors: Alexey Ruslyakov, Moscow Region (RU); Serguei M. Beloussov, Costa del Sol (SG); Stanislav Protasov, Moscow (RU); Maxim V. Lyadvinsky, Moscow (RU)

(73) Assignee: ACRONIS INTERNATIONAL GMBH, Shaffhausen (CH)

( * ) Notice: Subject to any disclaimer, the term of this patent is extended or adjusted under 35 U.S.C. 154(b) by 0 days.

(21) Appl. No.: 14/867,705

(22) Filed: Sep. 28, 2015

Related U.S. Application Data

(60) Provisional application No. 62/058,051, filed on Sep. 30, 2014.

(51) Int. Cl.
| | | |
|---|---|---|
| *G06F 11/00* | (2006.01) | |
| *G06F 11/20* | (2006.01) | |
| *H04L 29/08* | (2006.01) | |

(52) U.S. Cl.
CPC ........ *G06F 11/201* (2013.01); *H04L 67/1097* (2013.01); *G06F 2201/85* (2013.01)

(58) Field of Classification Search
CPC ............. G06F 11/1446; G06F 11/1469; G06F 11/1658; G06F 11/1662; G06F 11/201; G06F 11/2053; G06F 11/2094; G06F 2201/85; H04L 67/1097
See application file for complete search history.

(56) References Cited

U.S. PATENT DOCUMENTS

| | | |
|---|---|---|
| 7,047,380 B2 | 5/2006 | Tormasov et al. |
| 7,246,211 B1 | 7/2007 | Beloussov et al. |
| 7,275,139 B1 | 9/2007 | Tormasov et al. |
| 7,281,104 B1 | 10/2007 | Tsypliaev et al. |
| 7,318,135 B1 | 1/2008 | Tormasov et al. |
| 7,353,355 B1 | 4/2008 | Tormasov et al. |
| 7,366,859 B2 | 4/2008 | Per et al. |
| 7,475,282 B2 | 1/2009 | Tormasov et al. |
| 7,603,533 B1 | 10/2009 | Tsypliaev et al. |
| 7,636,824 B1 | 12/2009 | Tormasov |
| 7,650,473 B1 | 1/2010 | Tormasov et al. |
| 7,721,138 B1 | 5/2010 | Lyadvinsky et al. |
| 7,779,221 B1 | 8/2010 | Tormasov et al. |
| 7,831,789 B1 | 11/2010 | Tsypliaev et al. |

(Continued)

*Primary Examiner* — Joshua P Lottich
(74) *Attorney, Agent, or Firm* — K&L Gates LLP

(57) ABSTRACT

A method, computer program product, computing system, and system for automated disaster recovery are described. The method may include creating, using a backup engine running at a computing device, a backup of a server at a primary computing site; storing the created backup at a storage device at a secondary computing site; monitoring, using a monitoring component, an operating status of the server at the primary computing site; in response to determining, via the monitoring component, that the server at the primary computing site is unavailable based on the operating status, initiating a disaster recovery process at the secondary computing site; and running a copy of the server from the created backup at the secondary computing site.

11 Claims, 5 Drawing Sheets

(56) References Cited

U.S. PATENT DOCUMENTS

| | | |
|---|---|---|
| 7,886,120 B1 | 2/2011 | Tormasov |
| 7,895,403 B1 | 2/2011 | Tormasov et al. |
| 7,934,064 B1 | 4/2011 | Per et al. |
| 7,937,612 B1 | 5/2011 | Tormasov et al. |
| 7,949,635 B1 | 5/2011 | Korshunov et al. |
| 7,953,948 B1 | 5/2011 | Dyatlov et al. |
| 7,979,690 B1 | 7/2011 | Dyatlov et al. |
| 8,005,797 B1 | 8/2011 | Chepel et al. |
| 8,020,037 B1 * | 9/2011 | Schwartz ............ G06F 11/2094 714/41 |
| 8,051,044 B1 | 11/2011 | Dyatlov et al. |
| 8,069,320 B1 | 11/2011 | Per et al. |
| 8,073,815 B1 | 12/2011 | Korshunov et al. |
| 8,074,035 B1 | 12/2011 | Per et al. |
| 8,135,930 B1 * | 3/2012 | Mattox ............... G06F 9/45558 711/100 |
| 8,145,607 B1 | 3/2012 | Korshunov et al. |
| 8,180,984 B1 | 5/2012 | Per et al. |
| 8,225,133 B1 | 7/2012 | Tormasov et al. |
| 8,261,035 B1 | 9/2012 | Tormasov et al. |
| 8,296,264 B1 | 10/2012 | Dyatlov et al. |
| 8,312,259 B1 | 11/2012 | Dyatlov et al. |
| 8,347,137 B1 | 1/2013 | Chepel et al. |
| 8,484,427 B1 | 7/2013 | Lyadvinsky et al. |
| 8,645,748 B1 | 2/2014 | Chepel et al. |
| 8,732,121 B1 | 5/2014 | Zorin et al. |
| 8,856,927 B1 | 10/2014 | Beloussov et al. |
| 8,874,954 B1 * | 10/2014 | Gupte ............... G06F 11/2028 714/1 |
| 8,996,830 B1 | 3/2015 | Lyadvinsky et al. |
| 9,223,606 B1 * | 12/2015 | Vaidya ............... G06F 9/45558 |
| 9,594,636 B2 * | 3/2017 | Mortensen ............. G06F 11/14 |
| 9,715,346 B2 * | 7/2017 | Jain ...................... G06F 3/0619 |
| 10,761,947 B2 * | 9/2020 | Wei ..................... G06F 11/1451 |
| 2004/0153709 A1 * | 8/2004 | Burton-Krahn ........... H04L 1/22 714/4.11 |
| 2006/0085610 A1 * | 4/2006 | Iwamura ............. G06F 11/1662 711/162 |
| 2006/0225065 A1 | 10/2006 | Chandhok et al. |
| 2007/0156781 A1 * | 7/2007 | Kapoor ............... G06F 11/1458 |
| 2007/0168692 A1 * | 7/2007 | Quintiliano ......... G06F 11/1662 714/4.1 |
| 2007/0168711 A1 * | 7/2007 | Chen ................... G06F 11/2025 714/11 |
| 2008/0016387 A1 * | 1/2008 | Bensinger ........... G06F 11/1451 714/4.11 |
| 2010/0011178 A1 | 1/2010 | Feathergill |
| 2010/0082540 A1 * | 4/2010 | Isaacson ............. G06F 11/1458 707/624 |
| 2011/0167298 A1 * | 7/2011 | Lee ..................... G06F 11/1658 714/18 |
| 2011/0208908 A1 * | 8/2011 | Chou .................. G06F 11/1662 711/112 |
| 2011/0307657 A1 * | 12/2011 | Timashev ........... G06F 11/1451 711/112 |
| 2013/0185716 A1 * | 7/2013 | Yin ..................... G06F 9/45558 718/1 |
| 2013/0198557 A1 * | 8/2013 | Bensinger ........... G06F 11/1451 714/3 |
| 2015/0066844 A1 * | 3/2015 | Yin ..................... G06F 9/45558 707/612 |
| 2015/0186488 A1 * | 7/2015 | Fischer ............... G06F 11/1471 707/615 |
| 2015/0301910 A1 * | 10/2015 | Sathyanarayana ........................... G06F 11/1658 714/4.11 |
| 2017/0091221 A1 * | 3/2017 | Yin .................... G06F 17/30179 |

* cited by examiner

AUTOMATED DISASTER RECOVERY AND DATA REDUNDANCY MANAGEMENT SYSTEMS AND METHODS

CROSS-REFERENCE TO RELATED APPLICATIONS

This application claims priority to and the benefit of U.S. provisional patent application No. 62/058,051, filed on Sep. 30, 2014, the disclosure of which is herein incorporated by reference in its entirety.

TECHNICAL FIELD

The technical field may generally relate to recovery of physical or virtual machines and more particularly to reducing cost for recovery of physical or virtual machine files.

BACKGROUND

Physical or virtual machines may run business critical or other applications. Recovery of physical or virtual machines may require a standby system or a copy or duplicate of a primary server at a recovery site. Maintaining the standby system may consume or require electric power, cooling, RAM, processing resources, storage space, hardware maintenance, network resources, virtual server resources or other resources. Further, cloud service recovery sites may require payments for hosting a standby copy. Thus, maintaining the standby system may require a great deal of resources and expenses.

BRIEF SUMMARY

In part, the disclosure relates to systems and methods that avoid the need to have a stand-by copy of a primary site for an automated disaster recovery. In an embodiment, a method for automated disaster recovery may include creating, using a backup engine running at a computing device, a backup of a server at a primary computing site. The method may further include storing the created backup at a storage device at a secondary computing site. The method may also include monitoring, using a monitoring component, an operating status of the server at the primary computing site. Additionally, the method may include in response to determining, via the monitoring component, that the server at the primary computing site is unavailable based on the operating status, initiating a disaster recovery process at the secondary computing site. Moreover, the method may include running a copy of the server from the created backup at the secondary computing site.

One or more of the following features may be included. Initiating the disaster recovery process at the secondary computing site may include sending, using the monitoring component, a signal to a recovery agent running at the secondary computing site, the signal indicating that the server is to be recovered at the secondary computing site. The method may further include identifying, at the storage device at the cloud computing site, the backup corresponding to the server that is to be recovered. Running the copy of the server from the created backup at the secondary computing site may include mounting the copy of the server on a hypervisor at the secondary computing site from the backup. The method may include saving changes made to the server, while the server is running at the secondary computing site, to the backup.

In an embodiment, a computer program product may reside on a computer readable storage medium and may have a plurality of instructions stored on it. When executed by a processor, the instructions may cause the processor to perform operations for automated disaster recovery. The operations may include creating, using a backup engine running at a computing device, a backup of a server at a primary computing site. The operations may further include storing the created backup at a storage device at a secondary computing site. The operations may also include monitoring, using a monitoring component, an operating status of the server at the primary computing site. Additionally, the operations may include in response to determining, via the monitoring component, that the server at the primary computing site is unavailable based on the operating status, initiating a disaster recovery process at the secondary computing site. Moreover, the operations may include running a copy of the server from the created backup at the secondary computing site.

One or more of the following features may be included. Initiating the disaster recovery process at the secondary computing site may include sending, using the monitoring component, a signal to a recovery agent running at the secondary computing site, the signal indicating that the server is to be recovered at the secondary computing site. The operations may further include identifying, at the storage device at the cloud computing site, the backup corresponding to the server that is to be recovered. Running the copy of the server from the created backup at the secondary computing site may include mounting the copy of the server on a hypervisor at the secondary computing site from the backup. The operations may include saving changes made to the server, while the server is running at the secondary computing site, to the backup.

In an embodiment, a computing system for automated disaster recovery may include one or more processors. The one or more processors may be configured to create, using a backup engine running at a computing device, a backup of a server at a primary computing site. The one or more processors may also be configured to store the created backup at a storage device at a secondary computing site. The one or more processors may further be configured monitor, using a monitoring component, an operating status of the server at the primary computing site. Additionally, the one or more processors may be configured to determine, via the monitoring component, that the server at the primary computing site is unavailable based on the operating status, initiating a disaster recovery process at the secondary computing site. Moreover, the one or more processors may be configured to run a copy of the server from the created backup at the secondary computing site.

One or more of the following features may be included. Initiating the disaster recovery process at the secondary computing site may include sending, using the monitoring component, a signal to a recovery agent running at the secondary computing site, the signal indicating that the server is to be recovered at the secondary computing site. The one or more processors may be configured to identify, at the storage device at the cloud computing site, the backup corresponding to the server that is to be recovered. Running the copy of the server from the created backup at the secondary computing site may include mounting the copy of the server on a hypervisor at the secondary computing site from the backup. The one or more processors may be configured to save changes made to the server, while the server is running at the secondary computing site, to the backup.

In an embodiment, a method for automated disaster recovery may include initiating, via a recovery agent, a failback process to recover a server from a backup at a secondary computing site to a primary computing site. The method may further include saving, via the recovery agent, changes to the server made at the secondary computing site to the backup at a storage device. The method may also include initiating, via a backup engine, a recovery operation at the primary computing site. Additionally, the method may include reading, via the backup engine, data from the backup at the storage device at the secondary computing site and performing the recovery operation from the backup to an original server at the secondary computing site.

In an embodiment, a system for automated disaster recovery may include a server running at a primary computing site. The system may further include a backup engine including a backup agent that creates a backup of the server running at the primary computing site. The system may also include a monitoring component that monitors an operating status of the server running at a primary computing site and initiated a disaster recovery process based on the operating status. The system may additionally include a recovery agent that mounts a copy of the server from the backup at a secondary computing site and saves changes to the server made at the secondary computing site to a backup archive. Moreover, the system may include a hypervisor hosting a virtual server mounted from the backup.

The details of one or more implementations are set forth in the accompanying drawings and the description below. Other features and advantages will become apparent from the description, the drawings, and the claims

DETAILED DESCRIPTION

Overview

A cloud provider or system administrator may institute backup and recovery procedures to ensure persistence of applications, data, or other resources accessed through one or more physical or virtual machines. A replication method may be used when it is necessary to have machines in disaster recovery site up and running Backups of machines from the primary site may be kept them on the disaster recovery site, but in this case the site may lack disaster recovery automation (i.e., automatic failover).

For example, a backup archive of the physical or virtual machine may be created and stored offsite and may include the entire content of the physical or virtual machine before it failed. A copy of the primary server may be maintained in a disaster recovery site. This copy could be a duplicate physical server or a virtual machine, which may consume electric power, RAM, CPU, and/or storage space, which may cause problems and cost money.

Maintaining a physical/virtual infrastructure on a secondary site for an automated disaster recovery (DR) scenario may be a problem for a system administrator. The problem is related to cost on consumption of resources to maintain the secondary site. For example, electric power, cooling, hardware maintenance, and/or network resources may be necessary to maintain physical recovery sites. Virtual server resources such as RAM, CPU resources, storage, and/or network resources may be necessary to maintain virtual recovery sites. Further costs for cloud service recovery sites may include regular payments for hosting a stand-by-copy virtual machine in a service provider's cloud. Thus, administrators may spend additional costs for maintaining a stand-by copy of their primary site in a disaster recovery location, or may lack automation for a failover process.

By avoid the maintenance of a duplicate server or virtual machine cost may be saved. As discussed in the present disclosure, cost may be saved by mounting the server from the backup image on demand. Accordingly, in part, the disclosure relates to systems and methods that avoid the need to have a stand-by copy of a primary site for an automated disaster recovery. In view of the forgoing, there may be a need for a system in which reduces the cost of a secondary site by avoiding a standby copy of a primary site for an automated disaster recovery scenario. In various implementations, the techniques and features described in the present disclosure are directed towards avoiding a standby copy of a physical or virtual machine for disaster recovery by mounting a copy from the backup image on demand.

Figure 1:
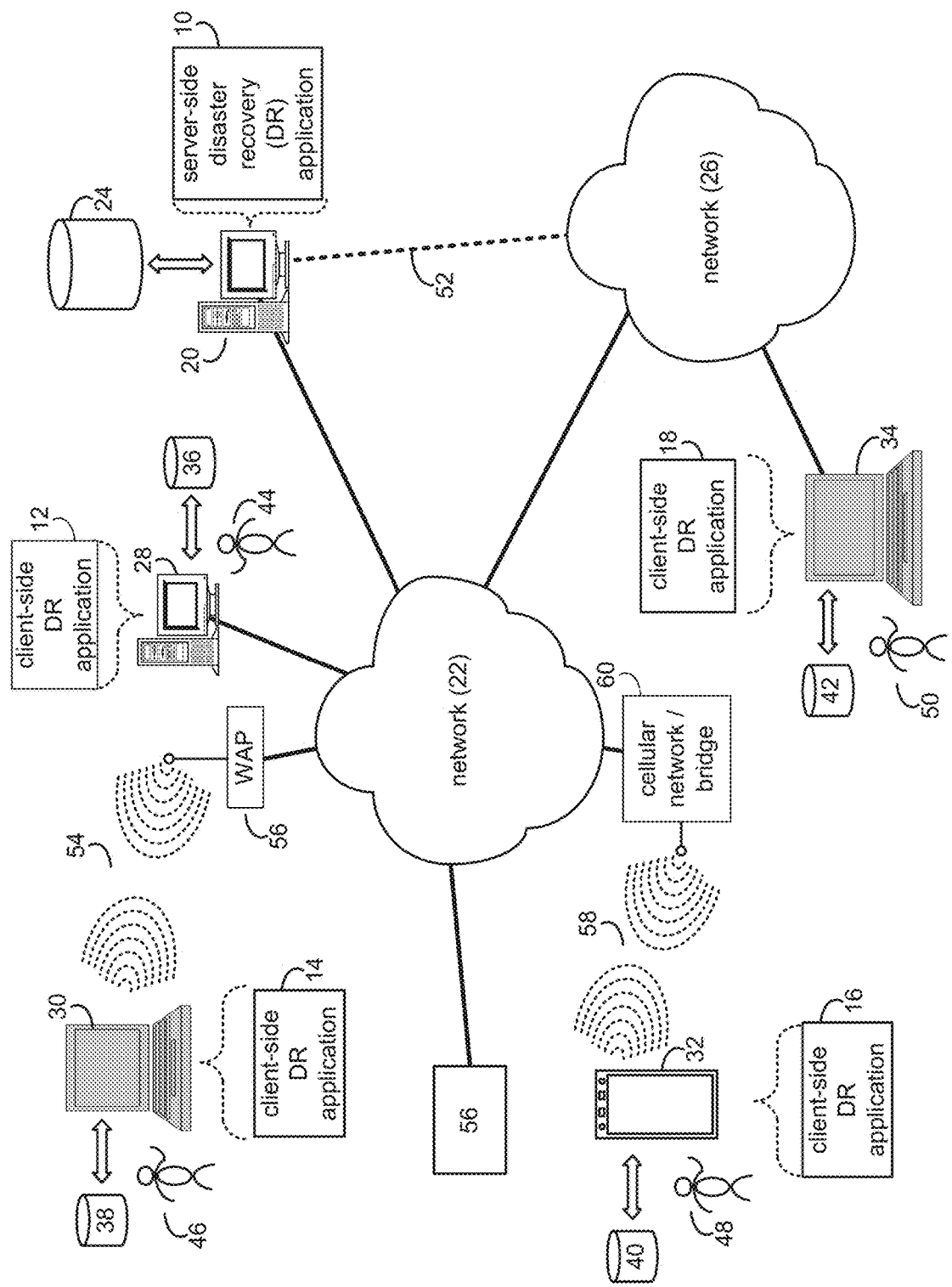
FIG. 1 depicts an example system that can execute implementations of the present disclosure.

Referring to FIG. 1, there is shown a server-side disaster recovery (DR) application 10 and client-side DR applications 12, 14, 16, and 18. Server application 10 and/or one or more of client applications 12, 14, 16, and/or 18 may execute one or more processes configured to carry out one or more of the features described herein. Server application 10 may be referred to as a process configured to carry out one or more of the features described herein, such as disaster recovery process 10. Further, one or more of client applications 12, 14, 16, and 18 may be referred to as a process configured to carry out one or more of the features described herein, such as disaster recovery processes 12, 14, 16, and/or 18.

As will be discussed below and referring now to FIG. 4, disaster recovery process or application 10 may create 300, using a backup engine running at a computing device, a backup of a server at a primary computing site. Disaster recovery process 10 may also store 302 the created backup at a storage device at a secondary computing site. Disaster recovery process 10 may further monitor 304, using a monitoring component, an operating status of the server at the primary computing site. Additionally, disaster recovery process 10 may, in response to determining, via the monitoring component, that the server at the primary computing site is unavailable based on the operating status, initiate 306 a disaster recovery process at the secondary computing site. Moreover, disaster recovery process 10 may run 308 a copy of the server from the created backup at the secondary computing site.

The disaster recovery process may be a server-side process (e.g., server-side disaster recovery process 10), a client-side process (e.g., client-side disaster recovery process 12, client-side disaster recovery process 14, client-side disaster recovery process 16, or client-side disaster recovery process 18), or a hybrid server-side/client-side process (e.g., a combination of server-side disaster recovery process 10 and one or more of client-side disaster recovery processes 12, 14, 16, 18).

System Overview

Referring to FIG. 1, server-side disaster recovery process 10 may reside on and may be executed by server computer 20, which may be in communication with network 22 (e.g., the Internet or a local area network). Examples of server computer 20 may include, but are not limited to: a personal computer, a server computer, a series of server computers, a mini computer, and/or a mainframe computer. The server computer 20 may be a distributed system and the operations of server computer 20 may execute on one or more processors, simultaneously and/or serially. For example, server computer 20 may be a symbolic representation of a cloud computing site, cloud environment, or cloud platform running multiple servers, computers, or virtual machines (e.g., a virtual machine host computer). Server computer 20 may execute one or more operating systems, examples of which may include but are not limited to: Microsoft Windows Server™; Novell Netware™; Redhat Linux™, Unix, or a custom operating system, for example.

The instruction sets and subroutines of server-side disaster recovery process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a solid state storage device; a RAID array; a random access memory (RAM); and a read-only memory (ROM).

Server computer 20 may execute a web server application that allows for access to server computer 20 (via network 22) using one or more protocols, examples of which may include but are not limited to HTTP (i.e., HyperText Transfer Protocol). Network 22 may be in communication with one or more secondary networks (e.g., network 26), examples of which may include but are not limited to: a local area network; a wide area network; or an intranet, for example.

Client-side disaster recovery processes 12, 14, 16, 18 may reside on and may be executed by client electronic devices 28, 30, 32, and/or 34 (respectively), examples of which may include but are not limited to personal computer 28, a television with one or more processors embedded therein or coupled thereto (not shown), laptop computer 30, data-enabled mobile telephone 32, notebook computer 34, a tablet (not shown), and a personal digital assistant (not shown), for example. Client electronic devices 28, 30, 32, and/or 34 may each be in communication with network 22 and/or network 26 and may each execute an operating system, examples of which may include but are not limited to Apple iOS™, Microsoft Windows™, Android™, Redhat Linux™, or a custom operating system.

The instruction sets and subroutines of client-side disaster recovery processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; solid state storage devices; RAID arrays; random access memories (RAM); read-only memories (ROM); compact flash (CF) storage devices; secure digital (SD) storage devices; and memory stick storage devices.

Client-side disaster recovery processes 12, 14, 16, 18 and/or server-side disaster recovery process 10 may be processes that run within (i.e., are part of) a cloud computing site, cloud computing application, cloud platform, or cloud environment. Alternatively, client-side disaster recovery processes 12, 14, 16, 18 and/or server-side disaster recovery process 10 may be stand-alone applications that work in conjunction with the cloud computing site, cloud computing application, cloud platform, or cloud environment. One or more of client-side disaster recovery processes 12, 14, 16, 18 and server-side disaster recovery process 10 may interface with each other (via network 22 and/or network 26).

Users 44, 46, 48, 50 may access server-side disaster recovery process 10 directly through the device on which the client-side disaster recovery process (e.g., client-side disaster recovery processes 12, 14, 16, 18) is executed, namely client electronic devices 28, 30, 32, 34, for example. Users 44, 46, 48, 50 may access server-side disaster recovery process 10 directly through network 22 and/or through secondary network 26. Further, server computer 20 (i.e., the computer that executes server-side disaster recovery process 10) may be in communication with network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing a wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and personal digital assistants to be interconnected using a short-range wireless connection.

Disaster Recovery Process

For the following discussion, server-side disaster recovery process 10 will be described for illustrative purposes and server computer 20 may run server-side disaster recovery application 10 to carry out some or all of the techniques and features described here. It should be noted that server-side disaster recovery process 10 may interact with client-side disaster recovery process 12 and may be executed within one or more applications that allow for communication with client-side disaster recovery process 12. However, this is not intended to be a limitation of this disclosure, as other configurations are possible (e.g., stand-alone, client-side disaster recovery processes and/or stand-alone server-side disaster recovery processes). For example, some implementations may include one or more of client-side disaster recovery processes 12, 14, 16, and 18 in place of or in addition to server-side disaster recovery process 10.

The systems and methods (e.g., disaster recovery process 10) described herein relate to the recovery of physical or virtual machines. In part, the systems and methods relate to reducing the cost of, and use of resources related to, recovery of physical or virtual machines by avoiding a standby copy of the physical or virtual machines.

The systems described herein may include one or more memory elements for backup of software, databases, and physical or virtual machines, and computer storage products including instructions to be executed by a processor to cause the processor to implement the methods described herein.

Figure 2:
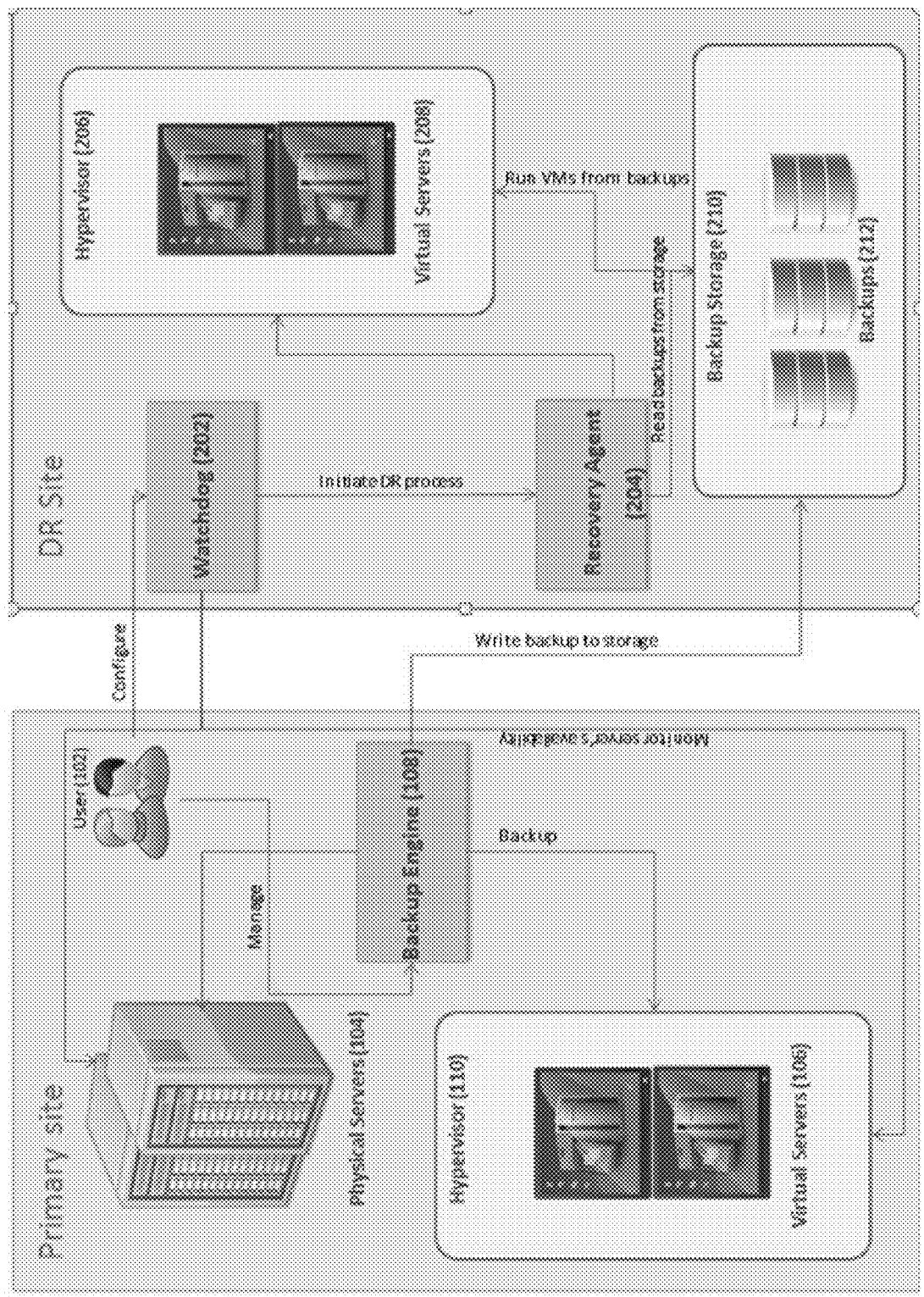
FIG. 2 also depicts an example system that can execute implementations of the present disclosure.

Referring now to FIG. 1, one or more of users 44, 46, 48, and 50 (or user 102 as shown in FIG. 2) may be cloud administrators or system administrators or may be cloud or system end-users. Referring now also to FIG. 2, the cloud or system administrators may access and administer the primary site through one or more of server computer 20 or client electronic devices 28, 30, 32, 34 (respectively). In an embodiment, server computer 20 may be may one of physical servers 104. A virtualization host device may include a virtual machine and may run a cloud or virtualization application such as VMWare™ or may include a bare-metal embedded hypervisor (e.g. VMware™ ESX™ and VMware™ ESXi™). Further, the virtualization host device may include a vCloud™ architecture that may enhance cooperation between hypervisors (e.g., hypervisor 110). Disaster recovery process 10 may include or may work in connection with one or more agents (e.g., software modules), which may include or may be configured to perform any number of the techniques or features described herein.

Disaster recovery process 10 may include a software component, executable code, function, subroutine, or other set of instructions designed to carry out one or more operations for automated disaster recovery.

Figure 4:
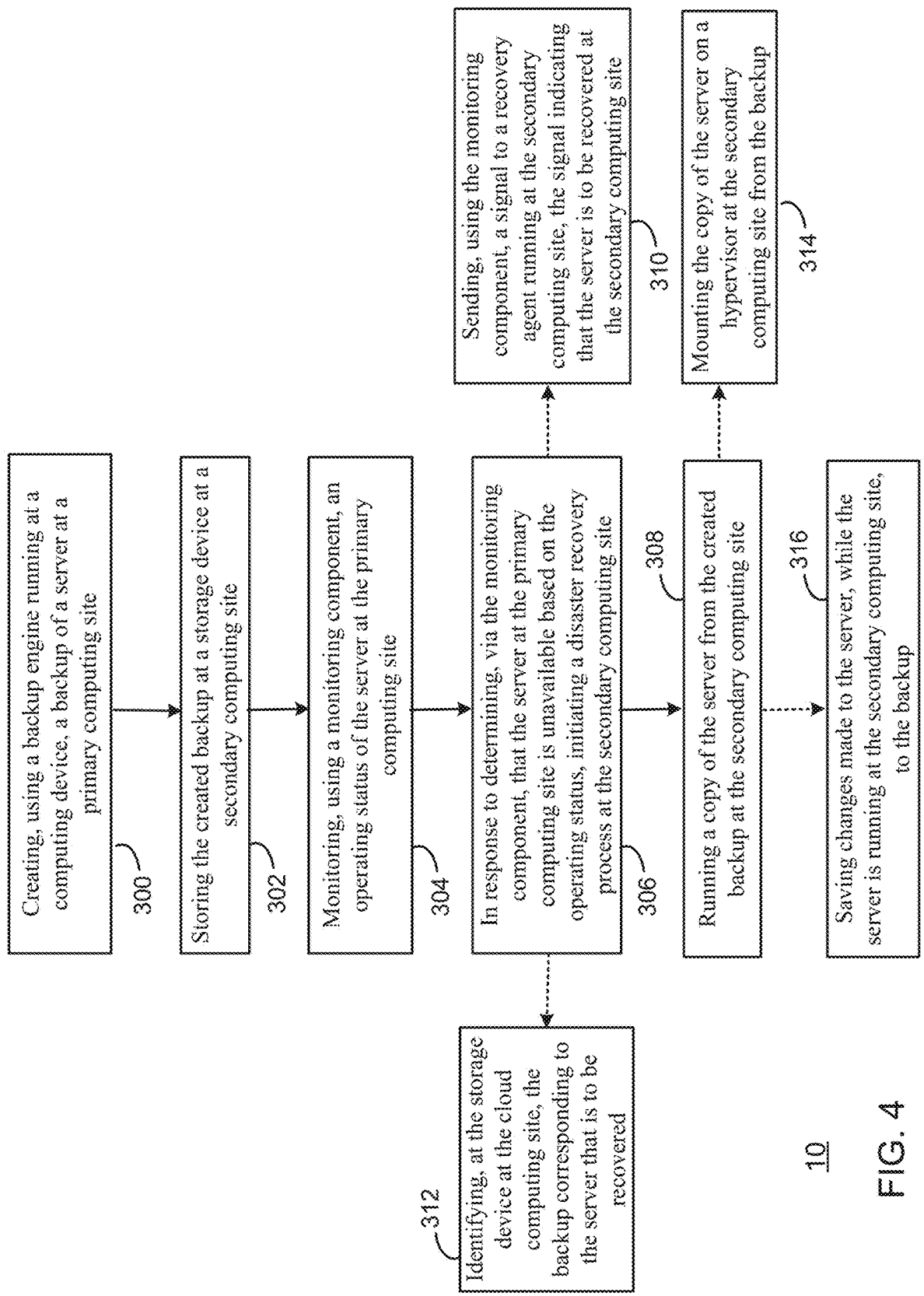
FIG. 4 is a flowchart illustrating an example process for automated disaster recovery in accordance with the present disclosure.

Referring now to FIGS. 2 and 4 an example failover process will be described. In an embodiment, disaster recovery process 10 may create 300 a backup (e.g., one of backups 212) of a server (e.g., one of physical servers 104 or virtual servers 106) at a primary computing site (e.g., primary site 100 as shown in FIG. 2). For example, user 102 may access backup engine 108 and may schedule regular backup for a production physical server 104 and virtual servers 106.

Physical servers 104 may run production applications. Virtual servers 106 may run production applications that may reside on a virtualization host (e.g., hypervisor 110). Disaster recovery process 10 may use a backup engine (e.g., backup engine 108) running at a computing device to create the backup (e.g., one of backups 212). Backup engine 108 may include one or more backup agents that may reside on physical hosts (e.g., physical servers 104). The backup agents may create regular backups of source systems (e.g., physical servers 104 or virtual servers 106) based on a schedule propagated to them from a management server. Backup agents may also track changed blocks on a file system to create backups incrementally.

Backup engine 108 may also include a management server or component. The management server may aggregate information from the backup agents and may perform centralized management of the backup agents. Further, management server may orchestrate the backup agents. For example, the management server may deliver backup schedules and recovery tasks created by the user to the backup agents. The management server may also monitor backup results from multiple agents and present backup statuses. In an implementation, the management server may enable centralized management and monitoring for the backup agents.

Further, disaster recovery process 10 may store 302 the created backup (e.g., one of backups 212) at a storage device (e.g., backup storage 210) at a secondary computing site (e.g., DR site 200 as shown in FIG. 2). Backup storage 210 may be a location at DR site 200 where backups reside.

Disaster recovery process 10 may monitor 304 an operating status of the server (e.g., one of physical servers 104 or virtual servers 106) at the primary computing site (e.g., primary site 100). Disaster recovery process 10 may use a monitoring component (e.g., watchdog 202), which may run at a computing device, to monitor the operating status. The operating status may reflect the server's health and may be based upon, at least in part, a heartbeat or heartbeat signal associated with the server. Watchdog 202 may be a component that monitors the health of the physical or virtual servers and may initiate the DR process or DR operations.

For example, disaster recovery process 10 may use an IP ping to monitor the operating status. Further, disaster recovery process 10 may use simple network management protocol (SNMP) monitoring to monitor the operating status. Disaster recovery process 10 may also send a request to a service or application on the server to monitor the operating status. In an implementation, disaster recovery process 10 may use a monitoring tool such as Nagios to monitor the operating status.

Further, in response to determining (e.g., via the monitoring component such as watchdog 202) that the server (e.g., one of physical servers 104 or virtual servers 106) at the primary computing site (e.g., primary site 100) is unavailable based on the operating status, disaster recovery process 10 may initiate 306 a disaster recovery process or one or more disaster recovery operations at the secondary computing site (e.g., DR site 200). The server may become unavailable for a number of reasons, including but not limited to network issues or power failure. For example, criteria for deciding to do a failover (or determine that the server is unavailable) may include the server not responding to an IP ping for a given time interval. Other criteria may be configured for server/service monitoring. For example, watchdog 202 may conduct regular API calls to a specific service, and may determine that the server is unavailable based on the response. In this way, watchdog 202 may monitor the availability of production physical servers 104 or virtual servers 106 on primary site 100 (e.g., using tcp/udp/snmp or any other protocol to implement a heartbeat).

In an implementation, disaster recovery process 10 may send 310 a signal to a recovery agent (e.g., recovery agent 204) running at the secondary computing site (e.g., DR site 200). The signal may indicate that the server or a particular server (e.g., one of physical servers 104 or virtual servers 106) is to be recovered at the secondary computing site (e.g., DR site 200). For example, the signal may be sent using the monitoring component (e.g., watchdog 202). Further, disaster recovery process 10 may identify 312, at the storage device (e.g., backup storage 210) at the cloud computing site (e.g., DR site 200), the backup (e.g., one of backups 212) corresponding to the server (e.g., one of physical servers 104 or virtual servers 106) that is to be recovered.

Disaster recovery process 10 may run 308 a copy of the server (e.g., one of physical servers 104 or virtual servers 106) from the created backup (e.g., one of backups 212) at the secondary computing site (e.g., DR site 200). Recovery agent 204 may run or mount a virtual machine from a backup and may save any changes applied to the virtual machine to a backup archive. Recovery agent 204 may find a backup 212 in backup storage 210 corresponding to the resource that needs to be recovered (e.g., one of physical servers 104 or virtual servers 106).

For example, disaster recovery process 10 may mount 314 the copy of the server (e.g., one of physical servers 104 or virtual servers 106) on a hypervisor (e.g., hypervisor 206) at the secondary computing site (e.g., DR site 200) from the backup (e.g., one of backups 212). In an implementation, recovery agent 204 may mount a virtual machine 208 on a hypervisor 206 on DR site 200 from the corresponding backup. Hypervisor 206 may hosts virtual servers which were mounted from backup (i.e., copies of original physical servers 104 or virtual servers 106). Further, disaster recovery process 10 may save 316 changes made to the server (e.g., one of virtual servers 208), while the server is running at the secondary computing site (e.g., DR site 200), to the backup (e.g., at backup storage 210).

Figure 3:
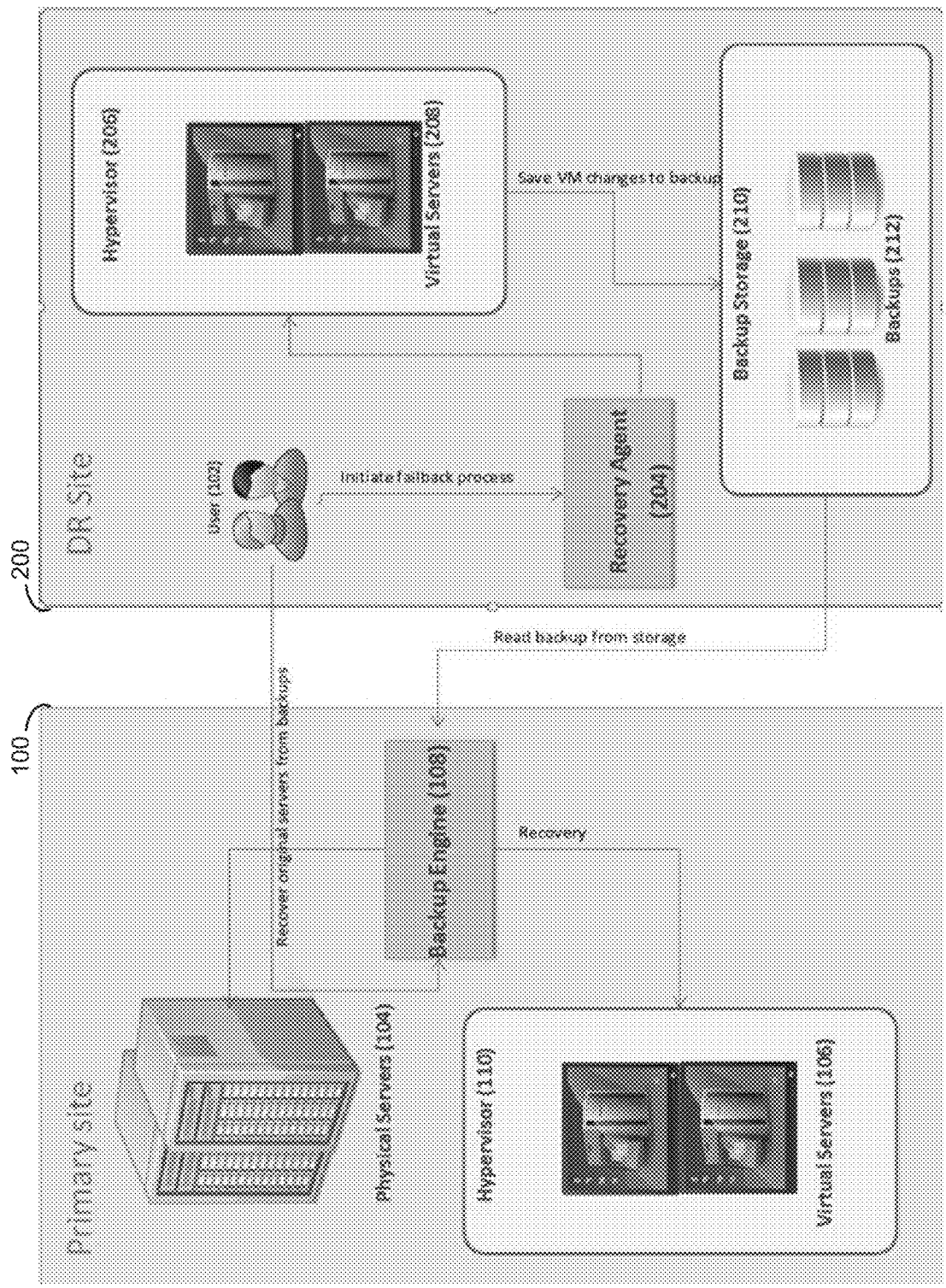
FIG. 3 also depicts an example system that can execute implementations of the present disclosure.
Figure 5:
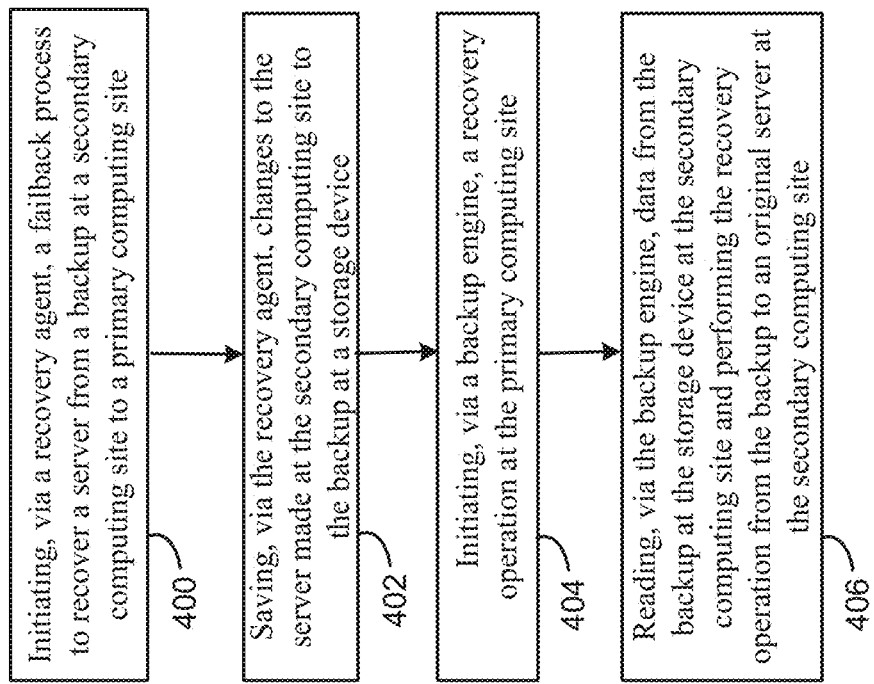
FIG. 5 is also a flowchart illustrating an example process for automated disaster recovery in accordance with the present disclosure.

Referring now to FIGS. 3 and 5 an example failback process will be described. In an embodiment, disaster recovery process 10 may initiate 400 a failback process to recover a server (e.g., one of physical servers 104 or virtual servers 106) from a backup (e.g., one of backups 212) at a secondary computing site (e.g., DR site 200) to a primary computing site (e.g., primary site 100). Recovery agent 204 may initiate the failback process. In an implementation, user 102 may access recovery agent 204 and may initiate a failback process. Further, disaster recovery process 10 may save 402 changes to the server (e.g., one of virtual servers 208) made at the secondary computing site (e.g., DR site 200) to the backup (e.g., one of backups 212) at a storage device (e.g., backup storage 210). In an implementation recovery agent 204 may save changes applied to a virtual machine (e.g., one of virtual servers 208) on a DR site (e.g., DR site 200) to the corresponding backup (e.g., one of backups 212).

Further, disaster recovery process 10 may initiate 404 a recovery operation at the primary computing site (e.g., primary site 100). In an implementation, user 102 may access backup engine 108 at primary site 100 and may initiate a recovery process. Disaster recovery process 10 may read 406 data from the backup (e.g., one of backups 212) at the storage device (e.g., backup storage 210) at the secondary computing site (e.g., DR site 200). Additionally, disaster recovery process 10 may perform the recovery operation from the backup (e.g., one of backups 212) to an original server (e.g., one of physical servers 104 or virtual servers 106) at the secondary computing site (e.g., DR site 200). In an implementation, backup engine 108 may read data from backups 212 in backups storage 210 on DR site 200 and perform recovery operations from these backups to the original physical servers 104 or virtual servers 106.

Further, in an implementation, a failback operation may also be automated such that user 102 need only initiate the failback process and recovery agent 204 may automatically access backup engine 108 in order to initiate recovery of physical/virtual servers on the primary site. For a virtual machine mounted on a DR site, a user may initiate a failover procedure. Recovery agent 204 may save changes on a DR site by backing up the mounted virtual machine and may shut it down. Further, recovery agent 204 may send a command to a management server (which may be part of the backup engine) on a primary site. The command may include an instruction to execute recovery from a specified backup to the original server/virtual machine. The ID of the original server/virtual machine may be stored in the meta information of a backup chain of the original server/virtual machine.

Further, a management server may find the original server/virtual machine registered in the ID and may identify the backup agent on a primary site associated with the original server/virtual machine. The management server may send the recovery command to the backup agent on a primary site which may execute the recovery and power-on the recovered server/virtual machine. In an implementation, the recovery agent from the failover process may act as a backup agent and vice versa, the previously used backup agent acts as a recovery agent.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application or in a similar manner and may provide various functionality of the systems and methods as SaaS.

The examples presented herein are intended to illustrate potential and specific implementations of the present invention. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers.

In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java).

Also, application servers may be provided in accordance with the .NET framework, including the Windows Communication Foundation, .NET Remoting, ADO.NET, and ASP-.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention. Accordingly, other embodiments and implementations are within the scope of the following claims. For example, the actions recited in the claims can be performed in a different order and still achieve desirable results.

What is claimed is:

1. A method for automated disaster recovery, the method comprising:

creating, using a backup engine running at a computing device, a backup image of a production server at a primary computing site, wherein backup engine comprises one or more backup agents and a management server, wherein backup agents reside on physical hosts or physical servers, wherein management server performs centralized management of one or more backup agents and scheduling of backups;

storing the created backup image at a storage device at a secondary computing site, wherein the secondary computing site is a data recovery site and wherein the storage device stores a plurality of backup images;

monitoring, using a monitoring component, an operating status of the production server at the primary computing site;

avoiding running a standby copy of the production server at the secondary computing site while the production server is running at the primary computing site;

sending, using the monitoring component, a signal to the recovery agent running at the secondary computing site;

in response to determining, via the signal from the monitoring component, that the production server at the primary computing site is unavailable, initiating a disaster recovery process at the secondary computing site, using a recovery agent at the secondary computing site, wherein the recovery agent is in communication with the monitoring component, the signal indicating that the production server is to be recovered at the secondary computing site;

reading the created backup image, using the recovery agent;

mounting a copy of the production server from the created backup image, using the recovery agent, wherein the copy of the production server is mounted on a hypervisor at the secondary computing site from the backup image;

saving any changes applied to the copy of the production server using the recovery agent to a backup archive; and running a copy of the production server from the created backup image at the secondary computing site.

2. The method of claim 1, further comprising:
identifying, at the storage device at the secondary computing site, the backup image corresponding to the production server that is to be recovered, wherein the signal is generated on an on demand basis.

3. The method of claim 1, further comprising:
saving changes made to the production server, while the production server is running at the secondary computing site, to the backup image.

4. A computer program product residing on a computer readable storage medium having a plurality of instructions stored thereon, which, when executed by a processor, cause the processor to perform operations for automated disaster recovery, the operations comprising:

creating, using a backup engine running at a computing device, a backup image of a production server at a primary computing site, wherein backup engine comprises one or more backup agents and a management server, wherein backup agents reside on physical hosts or physical servers, wherein management server performs centralized management of one or more backup agents and scheduling of backups;

storing the created backup image at a storage device at a secondary computing site;

monitoring, using a monitoring component, an operating status of the production server at the primary computing site;

avoiding running a standby copy of the production server at the secondary computing site while the production server is running at the primary computing site;

sending, using the monitoring component, a signal to a recovery agent running at the secondary computing site, the signal indicating that the production server is to be recovered at the secondary computing site;

in response to determining, via the signal from the monitoring component, that the production server at the primary computing site is unavailable, initiating a disaster recovery process at the secondary computing site;

mounting a copy of the production server on a hypervisor at the secondary computing site from the backup image; and running the copy of the production server from the created backup image at the secondary computing site.

5. The computer program product of claim 4, wherein the operations further comprise:
identifying, at the storage device at the secondary computing site, the backup image corresponding to the production server that is to be recovered.

6. The computer program product of claim 4, wherein the operations further comprise: saving changes made to the production server, while the production server is running at the secondary computing site, to the backup image.

7. A computing system for automated disaster recovery, the computing system comprising one or more processors, wherein the one or more processors are configured to:

create, using a backup engine running at a computing device, a backup image of a production server at a primary computing site, wherein backup engine comprises one or more backup agents and a management server, wherein backup agents reside on physical hosts or physical servers, wherein management server performs centralized management of one or more backup agents and scheduling of backups;

store the created backup image at a storage device at a secondary computing site;

monitor, using a monitoring component, an operating status of the production server at the primary computing site;

avoid running a standby copy of the production server at the secondary computing site while the production server is running at the primary computing site;

send, using the monitoring component, a signal to the recovery agent running at the secondary computing site;

in response to determining, via the signal from the monitoring component, that the production server at the primary computing site is unavailable, initiate a disaster recovery process at the secondary computing site using the recovery agent at the secondary computing site, wherein the recovery agent is in communication with the monitoring component, the signal indicating that the production server is to be recovered at the secondary computing site;

saving any changes applied to the copy of the production server using the recovery agent to a backup archive; and run a copy of the production server from the created backup image at the secondary computing site.

8. The computing system of claim 7, wherein the one or more processors are further configured to:

identify, at the storage device at the secondary computing site, the backup image corresponding to the production server that is to be recovered.

9. The computing system of claim 7, wherein the one or more processors are further configured to: save changes made to the production server, while the production server is running at the secondary computing site, to the backup image.

10. A method for automated disaster recovery, the method comprising:
    sending, using a monitoring component, a signal to a recovery agent running at a secondary computing site, the signal indicating that a production server is to be recovered at the secondary computing site;
    avoiding running a standby copy of the production server at the secondary computing site while the production server is running at the primary computing site;
    initiating, via the recovery agent, a failback process to recover the production server from a backup image at the secondary computing site;
    saving, via the recovery agent, changes to the production server made at the secondary computing site to the backup image at a storage device; and
    reading, via the backup engine, data from a mounted image of the backup image at the storage device at the secondary computing site and performing the recovery operation from the backup image to the production server at the secondary computing site, wherein backup engine comprises one or more backup agents and a management server, wherein backup agents reside on physical hosts or physical servers, wherein management server performs centralized management of one or more backup agents and scheduling of backups.

11. A system for automated disaster recovery, the system comprising:
    a production server running at a primary computing site;
    a backup engine comprising a backup agent that creates a backup image of the production server, the backup engine running at the primary computing site, wherein backup engine comprises one or more backup agents and a management server, wherein backup agents reside on physical hosts or physical servers, wherein management server performs centralized management of one or more backup agents and scheduling of backups;
    a monitoring component that monitors an operating status of the production server running at a primary computing site and initiated a disaster recovery process based on the operating status;
    a recovery agent, running at a secondary computing site, and responsive to signals from the monitoring component, that mounts a copy of the production server from the backup image at a secondary computing site and saves changes to the production server made at the secondary computing site to a backup archive in response to signal from monitoring component, wherein recovery agent is not running on a standby copy of the production server, wherein running the standby copy of the production server at the secondary computing site while the production server is running at the primary computing site is avoided; and
    a hypervisor, at the secondary computing site, hosting a virtual production server mounted from the backup image, wherein the hypervisor is configured to run one or more virtual machines from the backup image and save any changes applied to the virtual machine to a backup archive.

* * * * *